UNITED STATES PATENT OFFICE 2,478,873

OXYPTEROYL GLUTAMIC ACID AND PROCESS OF PREPARING SAME

Gustav J. Martin and Harold Urist, Philadelphia, Pa., assignors to The National Drug Company, Philadelphia, Pa., a corporation of Pennsylvania No Drawing. Application May 5, 1947, Serial No. 746,159

7 Claims. (Cl. 260—251)

Our invention relates to new chemotherapeutic agents and to a process of preparing the same. More particularly, it relates to oxyfolic acid and its salts, and to a method of producing these novel compounds.

Oxyfolic acid possesses the following structural formula:

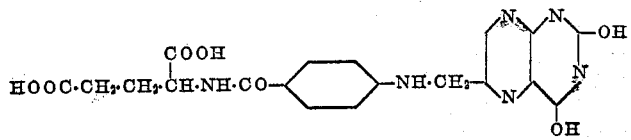

It is a brown powder, insoluble in water and readily soluble in dilute aqueous solutions of caustic alkalies, wherein it forms alkali metal salts. Other salts may readily be obtained from the free acid by neutralizing it with suitable bases.

The oxyfolic acid and its salts display interesting pharmacological properties. In particular, they possess valuable antibacterial properties. It is believed that the oxyfolic acid is a displacing agent for folic acid, a member of the vitamin B complex. It is highly effective against pathogenic bacteria and may be taken orally, injected intravenously, or incorporated in an ointment and applied externally.

We have succeeded in preparing the oxyfolic acid by condensing para-amino-benzoyl glutamic acid, acrolein dibromide and 5,6-diaminouracil. The condensation is preferably effected in a buffered aqueous solution at room temperature. All three reaction materials may be condensed simultaneously, or the last two materials mentioned may first be condensed, and the condensation product thus obtained thereafter condensed with the first mentioned material. Either the dextro- or levo rotatory forms of para-amino-benzoyl glutamic acid or mixtures thereof may be employed. In place of the free 5,6-diaminouracil, one may likewise use its salts, such as the bisulfate, sulfite and bisulfite.

The water-insoluble, crude reaction product may be purified by dissolving it in a dilute, aqueous, caustic alkali solution, filtering said solution and then reprecitating the free acid by the addition of a dilute mineral acid. Our process may be better understood upon consideration of the following illustrative example. Obviously, our invention is not limited to the specific reaction conditions stated therein, as these may be varied widely.

Example

The reaction materials employed for the preparation of the oxyfolic acid are the following:

(1) Para-amino-benzoyl glutamic acid, having the formula:

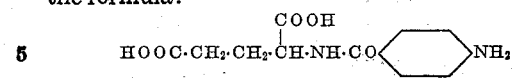

This compound may be prepared by reacting equimolecular proportions of glutamic acid hydrochloride and para-nitro-benzoyl chloride in a strongly alkaline solution, filtering the reaction mixture and acidifying the filtrate. The precipitate thus formed consists of para-nitro-benzoyl glutamic acid. It is dissolved in anhydrous ethyl alcohol and the nitro group is reduced to the amino group by hydrogenation in the presence of a nickel catalyst.

(2) Acrolein dibromide, of the following formula:

$$CH_2Br \cdot CHBr \cdot CHO$$

This compound may be prepared by direct bromination of a cold solution of acrolein in carbon disulfide using an equimolecular amount of bromine, and then distilling off the solvent in vacuo.

(3) 5,6-diaminouracil, having the formula:

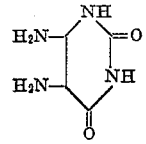

This may be prepared from urea and ethyl cyanoacetate according to the method described by Bogert and Davidson in the Journal of the American Chemical Society, volume 55 (1933) on page 1668. It is purified by dissolving it in a dilute, sodium hydroxide solution containing some sodium sulfite, and then filtering the solution. The filtrate is poured into boiling dilute sulphuric acid sufficient to neutralize, the mixture cooled and left overnight. The yellow precipitate formed is filtered, washed with water and dried. It is a pure bisulphate of 5,6-diaminouracil.

The reaction materials, prepared as described above, are condensed to form the oxyfolic acid. A buffering solution is made up by mixing 66.9 grams of anhydrous sodium acetate with 54.4 grams of glacial acetic acid and diluting the mixture with water to form one liter of solution.

To 600 cc. of this solution there are added at room temperature, 26.6 grams (0.1 mole) of para-amino-benzoyl glutamic acid, 21.6 grams (0.1 mole) of acrolein dibromide and 33.6 grams (0.1 mole) of the 5,6-diaminouracil bisulphate, and the mixture is then stirred for 3 hours.

The reaction mixture was allowed to stand at room temperature overnight, and the brown precipitate which formed was filtered out and dried in the air. There was thus obtained, 23 grams of a crude product which was purified by dissolving it in a dilute, aqueous solution of sodium hydroxide, filtering and precipitating the pure product from the filtrate by the addition of dilute hydrochloric acid. The precipitate, when dried in air, weighed 10.35 grams. It was a brown powder of indeterminate melting point, and constituted the desired oxyfolic acid of the structural formula previously set forth herein.

We claim:

1. Chemotherapeutic agents having the following general formula:

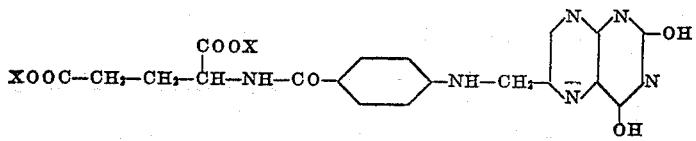

wherein X represents a member selected from the group consisting of hydrogen and alkali metals.

2. The chemotherapeutic agents of claim 1 wherein X represents hydrogen.

3. The chemotherapeutic agents of claim 1 wherein X represents an alkali metal.

4. The chemotherapeutic agents of claim 1 wherein X represents sodium.

5. A process for preparing oxypteroyl glutamic acid, which comprises condensing para-aminobenzoyl glutamic acid, acrolein dibromide and 5,6-diaminouracil.

6. A process as claimed in claim 5, wherein substantially equimolecular proportions of the reagents are employed.

7. A process as claimed in claim 6, wherein the condensation is effected in a buffered aqueous solution at room temperature.

GUSTAV J. MARTIN.
HAROLD URIST.

REFERENCES CITED

The following references are of record in the file of this patent:

UNITED STATES PATENTS

| Number | Name | Date |
| --- | --- | --- |
| 2,345,215 | Purrmann | Mar. 28, 1944 |

OTHER REFERENCES

Chemical Abstracts 39, 46842,5 (1945).

Angier, Science 103, (No. 2,683), 667-669 (May 1946).